(12) United States Patent
Vedamanikam

(10) Patent No.: US 10,106,254 B2
(45) Date of Patent: Oct. 23, 2018

(54) VTOL AIRCRAFT HAVING DUCTED THRUST FROM A CENTRAL FAN

(71) Applicant: Maran John Vedamanikam, Casa Grande, CA (US)

(72) Inventor: Maran John Vedamanikam, Casa Grande, CA (US)

( * ) Notice: Subject to any disclaimer, the term of this patent is extended or adjusted under 35 U.S.C. 154(b) by 0 days.

(21) Appl. No.: 15/876,153

(22) Filed: Jan. 20, 2018

(65) Prior Publication Data
US 2018/0208304 A1    Jul. 26, 2018

Related U.S. Application Data

(60) Provisional application No. 62/448,891, filed on Jan. 20, 2017.

(51) Int. Cl.
*B64C 29/00* (2006.01)
*B64C 1/06* (2006.01)
*B64C 39/02* (2006.01)

(52) U.S. Cl.
CPC .......... *B64C 29/0016* (2013.01); *B64C 1/068* (2013.01); *B64C 39/024* (2013.01)

(58) Field of Classification Search
CPC .......................... B64C 29/0016; B64C 39/024
USPC ...................................................... 244/23 C
See application file for complete search history.

(56) References Cited

U.S. PATENT DOCUMENTS

| | | | | |
|---|---|---|---|---|
| 3,067,967 A * | 12/1962 | Barr | ...................... | B64C 39/001 180/129 |
| 3,101,917 A * | 8/1963 | Sudrow | ................. | B64C 11/001 244/23 C |
| 3,123,320 A * | 3/1964 | Slaughter | .............. | B64C 39/001 244/12.2 |
| 3,224,711 A * | 12/1965 | Warren | ................. | B64C 39/001 244/23 C |
| 3,267,667 A * | 8/1966 | Erwin | ................. | B64C 29/0016 244/23 B |
| 3,640,489 A * | 2/1972 | Jaeger | ................... | B64C 39/001 244/23 C |
| 3,837,600 A * | 9/1974 | Mason | ................ | B64C 29/0016 244/12.1 |
| 3,912,201 A * | 10/1975 | Bradbury | ............ | B64C 29/0016 239/265.25 |
| 3,946,970 A * | 3/1976 | Blankenship | ......... | B64C 39/001 244/23 C |
| 3,955,780 A * | 5/1976 | Postelson | ............ | B64C 29/0016 244/12.3 |
| 3,972,490 A * | 8/1976 | Zimmermann | ..... | B64C 29/0016 244/12.3 |
| 4,050,652 A * | 9/1977 | DeToia | ................. | B64C 39/001 244/12.2 |

(Continued)

*Primary Examiner* — Christopher P Ellis
(74) *Attorney, Agent, or Firm* — Michael D. Eisenberg

(57) ABSTRACT

A VTOL aircraft having thrust and directional control comprises a fan for providing a centrifugal flow of air. At least one duct allows for and directs air flow. At least one nozzle allows for exhaust release. Each of the at least one nozzle has a first end attached to one of each of the at least one duct. Each of the at least one nozzle has a turn measuring 90° and faces downward from the second end of each of the at least one duct. Each of the at least one nozzle has a second end at which is a vane for redirecting airflow. The VTOL aircraft also has an attachment for landing.

17 Claims, 9 Drawing Sheets

(56) References Cited

U.S. PATENT DOCUMENTS

| | | | | |
|---|---|---|---|---|
| 4,452,410 A * | 6/1984 | Everett | ............... | B64C 39/06 244/12.2 |
| 5,170,963 A * | 12/1992 | Beck, Jr. | ............... | B64C 39/064 244/12.2 |
| 5,203,521 A * | 4/1993 | Day | ............... | B64C 39/064 244/12.2 |
| 5,653,404 A * | 8/1997 | Ploshkin | ............... | B63G 8/00 244/12.2 |
| 6,053,451 A * | 4/2000 | Yu | ............... | B64C 39/001 244/12.2 |
| 6,382,560 B1 * | 5/2002 | Ow | ............... | B64C 27/20 244/12.2 |
| 6,547,180 B1 * | 4/2003 | Cassidy | ............... | B64C 15/00 244/12.5 |
| 6,572,053 B2 * | 6/2003 | Salas | ............... | B60V 1/02 244/12.2 |
| 6,581,872 B2 * | 6/2003 | Walmsley | ............... | B64C 27/20 244/12.2 |
| 6,666,403 B1 * | 12/2003 | Follensbee | ............... | B64C 29/0016 244/12.2 |
| 7,410,123 B2 * | 8/2008 | Nunnally | ............... | B64C 27/20 244/23 C |
| 8,727,266 B2 * | 5/2014 | Cardozo | ............... | B64C 27/82 244/23 C |
| 2003/0127559 A1 * | 7/2003 | Walmsley | ............... | B64C 27/20 244/23 C |
| 2010/0051754 A1 * | 3/2010 | Davidson | ............... | B64C 17/06 244/23 C |
| 2010/0301158 A1 * | 12/2010 | Harris | ............... | B64C 15/14 244/12.5 |

* cited by examiner

VTOL AIRCRAFT HAVING DUCTED THRUST FROM A CENTRAL FAN

CROSS-REFERENCES TO RELATED APPLICATIONS

This application claims priority from U.S. Provisional Application Ser. No. 62/448,891 filed Jan. 20, 2017, which is hereby incorporated herein by reference in its entirety.

FIELD OF THE INVENTION

The present invention relates to a multi-ducted centrifugal fan VTOL aircraft.

BACKGROUND OF THE INVENTION

Currently-available VTOL drone aircrafts are of the multi-rotor type that suffer from limited flight time and payload capacity due to two main reasons: their electrical operation which requires heavy batteries that must be recharged over a period of time, and the inefficiency of the use of rotors or propellers that do not provide high amounts of overall lift. They cannot accommodate the use of fuel (e.g. gasoline) for quick mission turnaround time and must use additional pre-charged batteries. The weight of the batteries limits the amount of payload they can carry, as well as the operational flight time, because batteries do not have a high energy capacity in relation to their weight like fuel does. The current aircraft typically have exposed rotors or propellers that create safety hazards to personnel and property.

It is thus an aim of the present invention to address at least one of these issues.

BRIEF SUMMARY OF THE EMBODIMENTS OF INVENTION

A VTOL aircraft having thrust and directional control comprises a main body. The main body has an upper shell in a shape of a parabola, with the shape of a parabola facing and expanding into a downward-facing end. The upper shell of the main body has a top opening in a shape of a circle. The main body also has a bottom plate in a shape of a flat circle, sealed to the downward-facing end of the upper shell of the main body. The top opening of the upper shell of the main body provides an inlet for air to enter into the housing. The upper shell of the main body has at least one opening.

A fan provides a centrifugal flow of air. The fan has a central hub, and a plurality of blades extends radially outward from the central hub. The fan is mounted to the bottom plate of the main body.

At least one duct allows and directs air flow. At least one nozzle allows for exhaust release. Each nozzle is attached one each of the ducts. Each nozzle has a turn measuring 90° and facing downward from its respective duct. Each nozzle has an end at which is a vane for redirecting airflow.

DETAILED DESCRIPTION OF THE EMBODIMENTS OF THE INVENTION

Figure 1:
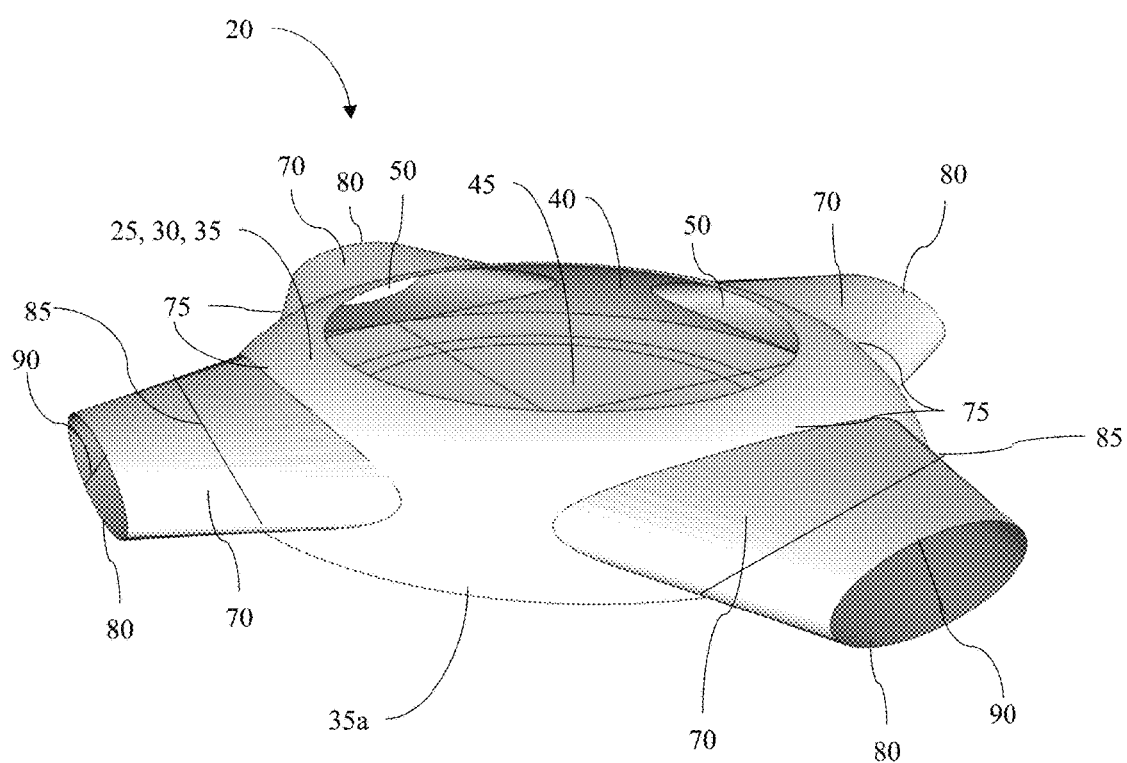
FIG. 1 depicts an aspect of a VTOL aircraft of the invention.
Figure 2:
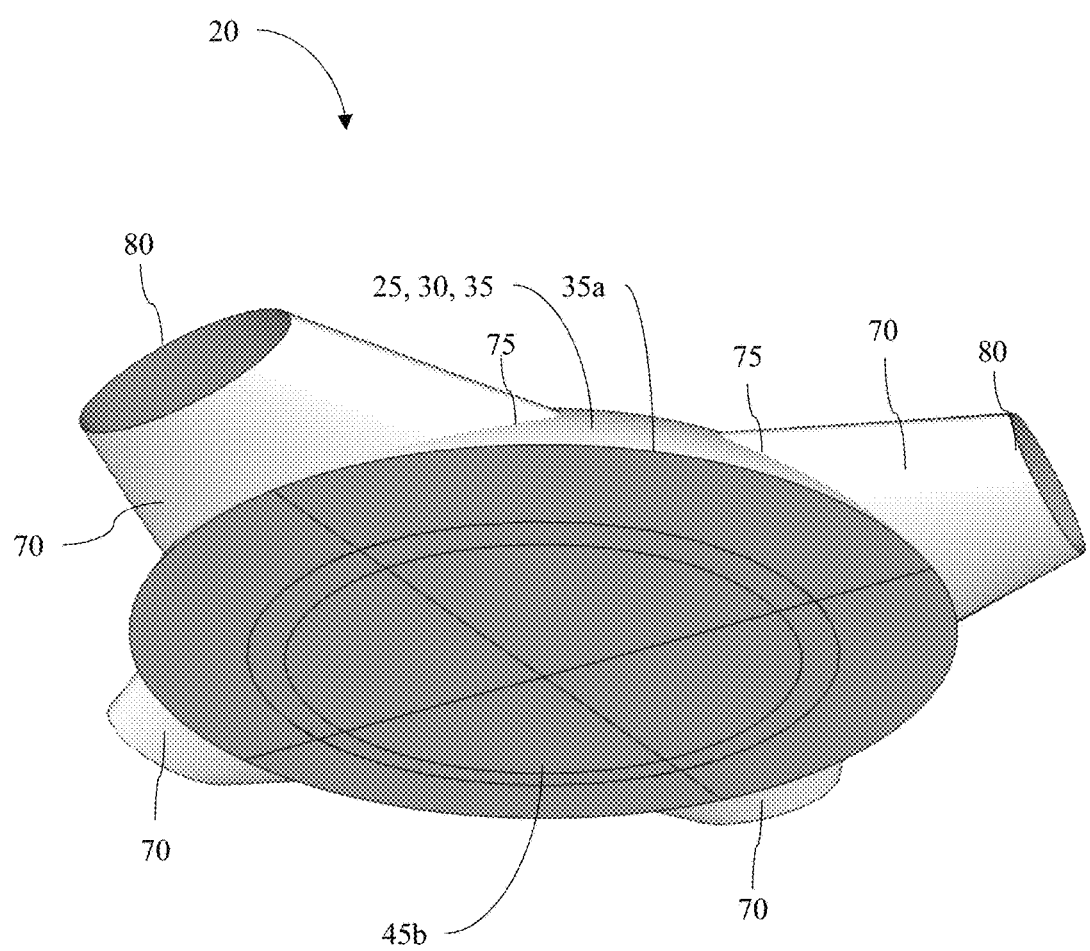
FIG. 2 depicts a bottom view of the VTOL aircraft of the invention.
Figure 3:
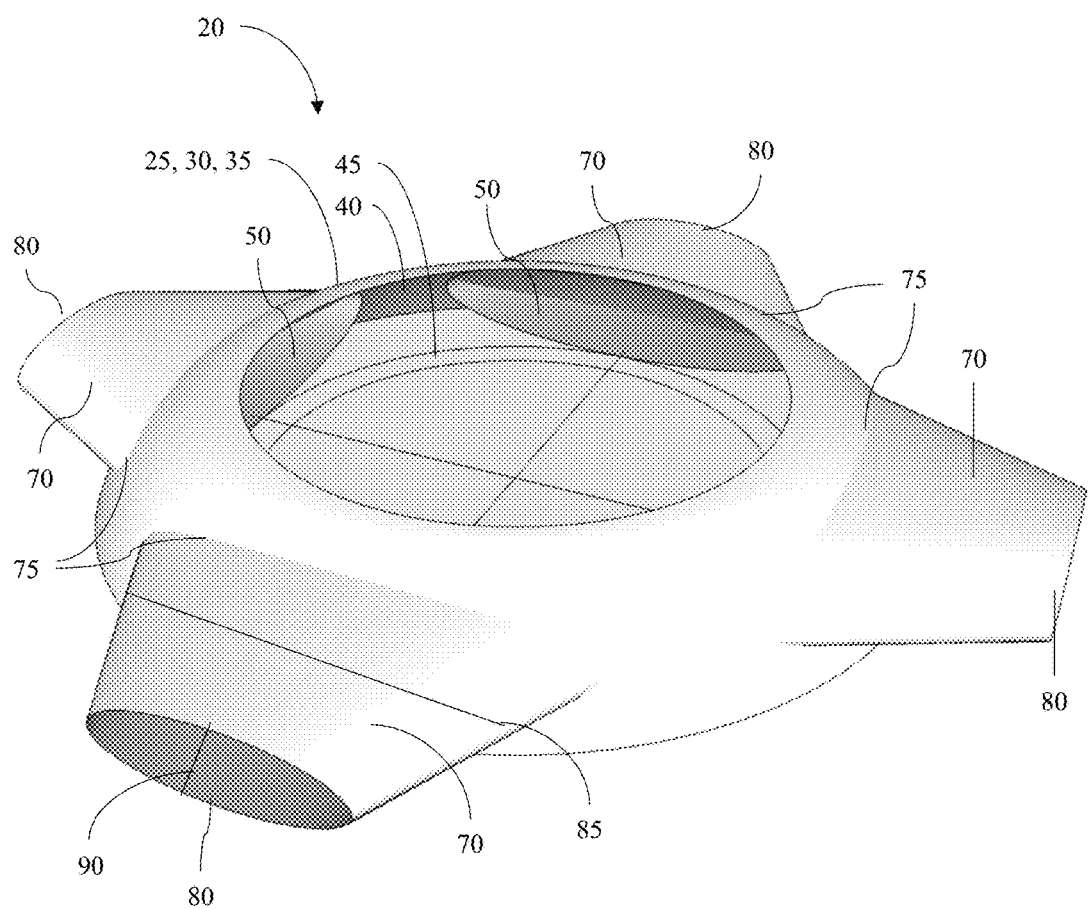
FIG. 3 depicts a top view of the VTOL aircraft of the invention.

First depicted in FIG. 1, a VTOL aircraft 20 comprises a housing 25. The housing 25 comprises a main body 30. The main body 30 has an upper shell 35 in a shape of a parabola, with the shape of a parabola facing and expanding into a downward-facing end 35a. The upper shell 35 of the main body 30 has a top opening 40 in a shape of a circle. The main body 30 also has a bottom plate 45 in a shape of a flat circle, sealed to the downward-facing end 35a of the upper shell 35 of the main body 30. The bottom plate 45 has a top side 45a (FIG. 4) and a bottom side 45b (FIG. 2). The top opening 40 of the upper shell 35 of the main body 30 provides an inlet for air to enter into the housing 25. The upper shell 35 of the main body 30 has at least one opening 50, for instance a set of four openings 50. The set of four openings 50 each has a shape of an oval. As illustrated in FIG. 3, each of the set of four openings 50 is placed around the upper shell 35 of the main body 30 at 90° to each other.

Figure 5:
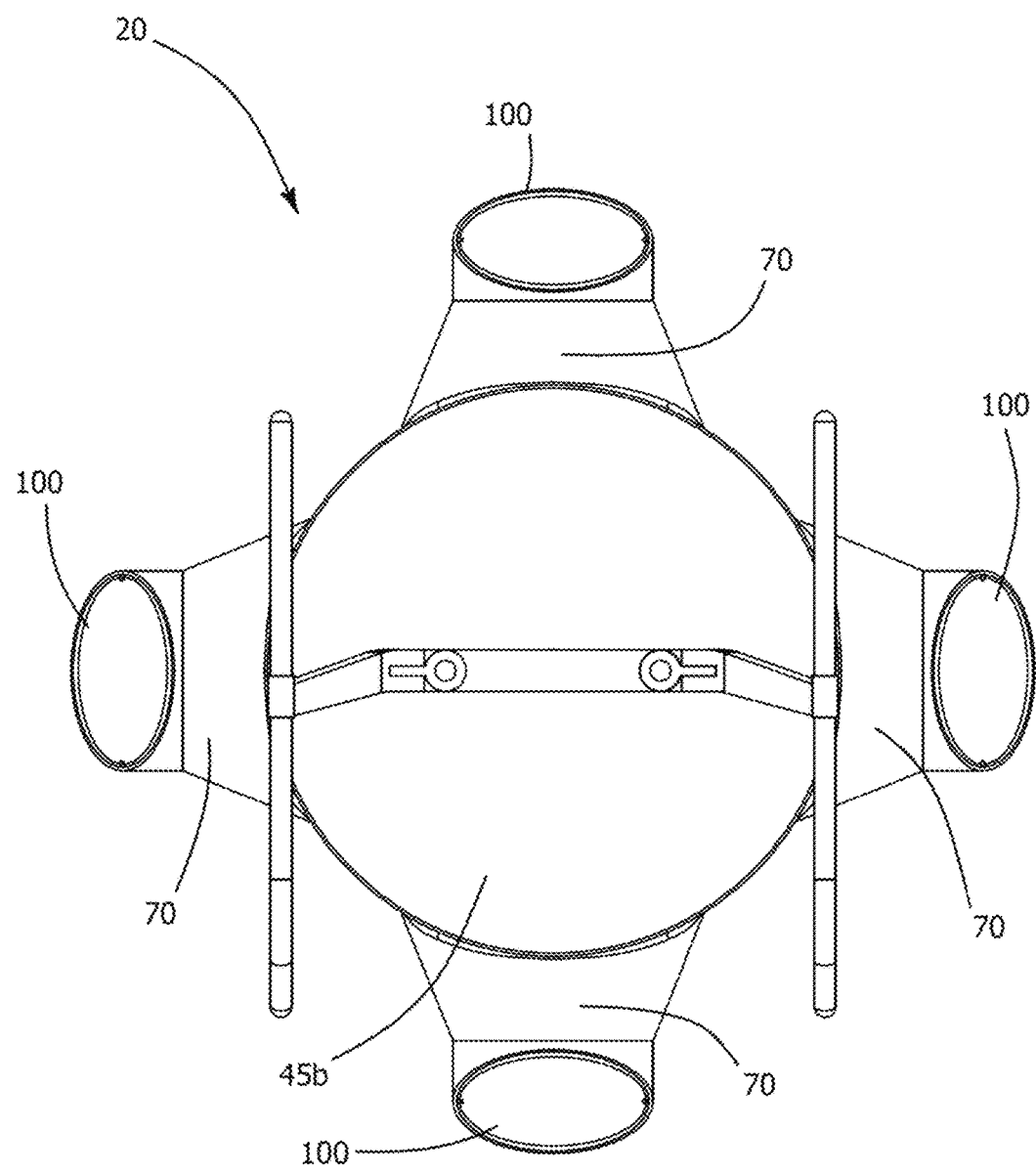
FIG. 5 depicts a bottom view of the VTOL aircraft of the invention.

A fan 55 (FIG. 6) provides a centrifugal flow of air. The fan 55 has a central hub 60 (FIG. 6), and a plurality of blades 65 (FIG. 6) extends radially outward from the central hub 60. The fan 55 is mounted to the top side 45a of the bottom plate 45 of the main body 30. An attachment 120 for landing the VTOL aircraft 20 is attached to the bottom side 45b of the bottom plate 45 of the main body 30, as depicted in FIGS. 5 and 7.

At least one duct 70 (FIGS. 1 and 3), for instance a group of four ducts 70, allows and directs air flow. Each of the group of four ducts 70 has a cross-section having a shape of an oval. Each of the group of four ducts 70 has a first end 75 and a second end 80. The first end 75 of each of the group of four ducts 70 fits into one of the set of four openings 50, and the second end 80 of each of the group of four ducts 70 extends horizontally outward therefrom. Each of the group of four ducts 70 has a width 85 and a height 90 (FIGS. 1 and 3). The width 85 of each of the group of four ducts 70 decreases from the first end 75 to the second end 80 of each of the group of four ducts 70. The height 90 of each of the group of four ducts 70 remains constant from the first end 75 to the second end 80 of each of the group of four ducts 70.

Figure 4:
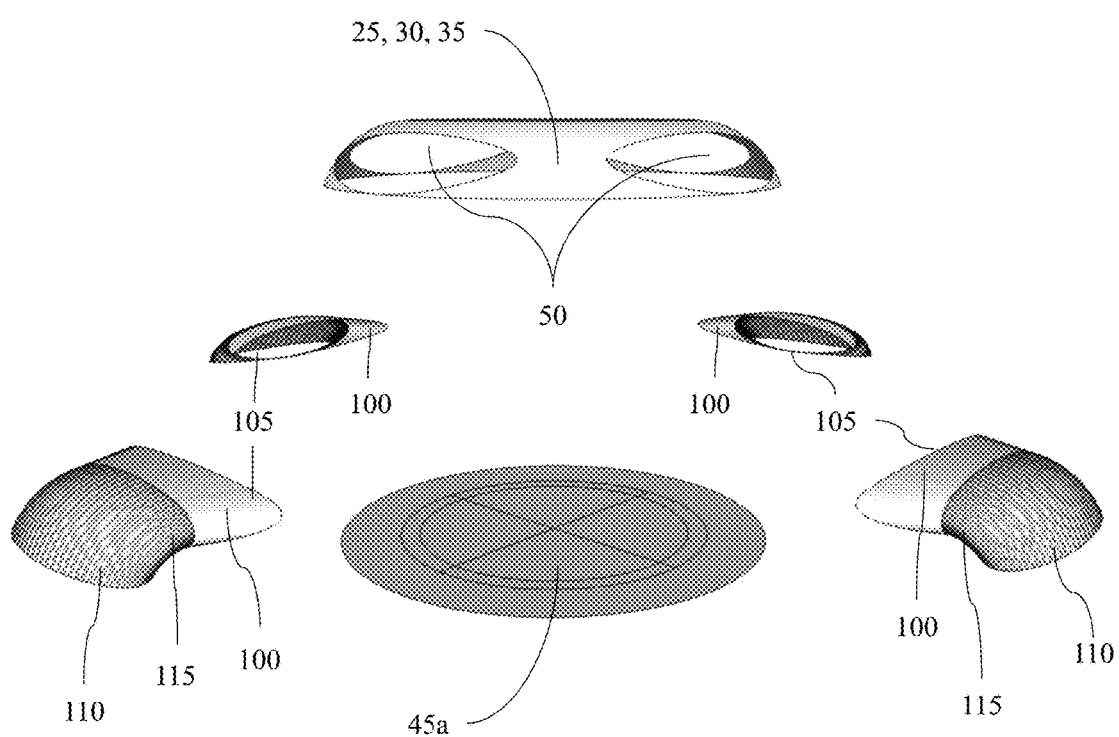
FIG. 4 depicts an exploded view of the VTOL aircraft of the invention.
Figure 7:
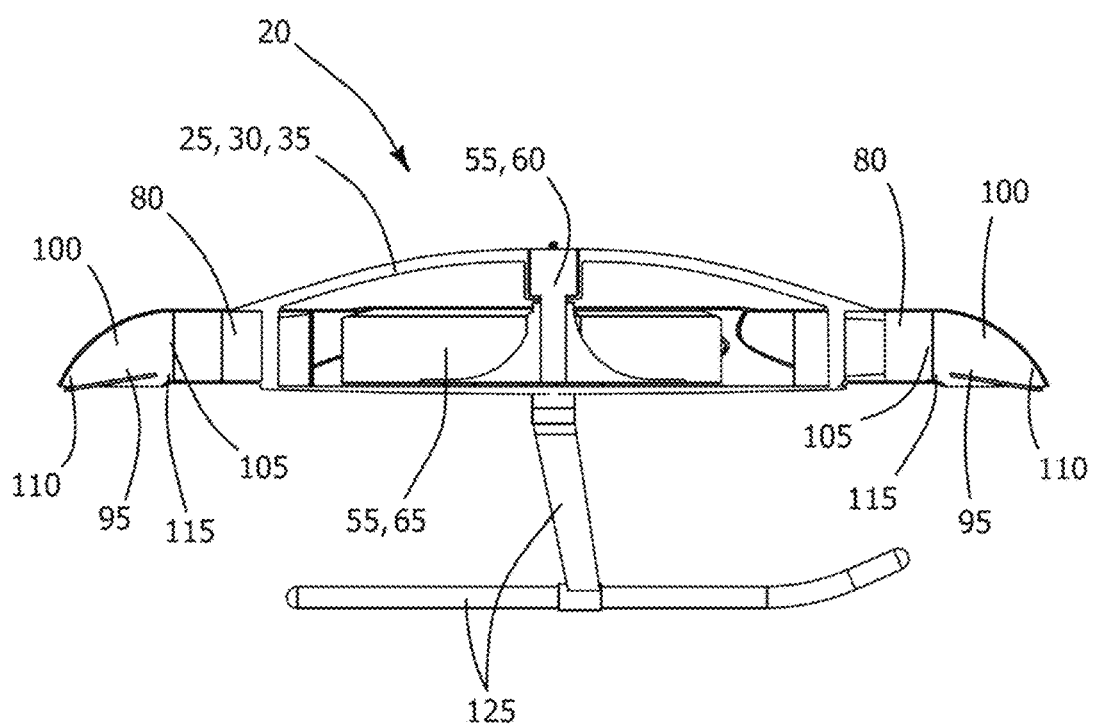
FIG. 7 depicts a cross-sectional view of the VTOL aircraft of the invention.

As illustrated in FIGS. 4 and 7, at least one nozzle 100, for instance, a group of four nozzles 100, allows for exhaust release. Each of the group of four nozzles 100 has a cross-section having a shape of an oval. Each of the group of four nozzles 100 has a first end 105 attached to the second end 80 of one of each of the group of four ducts 70. Each of the group of four nozzles 100 has a turn 115 (FIGS. 4 and 7) measuring 90° and facing downward from the second end 80 of each of the group of four ducts 70. Each of the group of four nozzles 100 has a second end 110 at which is a vane 95 for redirecting airflow.

In a variant, the size of the top opening 40 of the main body 30 is 87.5% of the size of the fan 55. Each of the four ducts 70 is 15.6% of the size of the top opening 40 of the main body 30. Each of the second ends 80 of each duct 70 is 50% of the size of the first ends 75 of each duct 70. Each of the second ends 80 of each duct 70 is 7.8% of the size of the top opening 40 of the main body 30.

Figure 8:
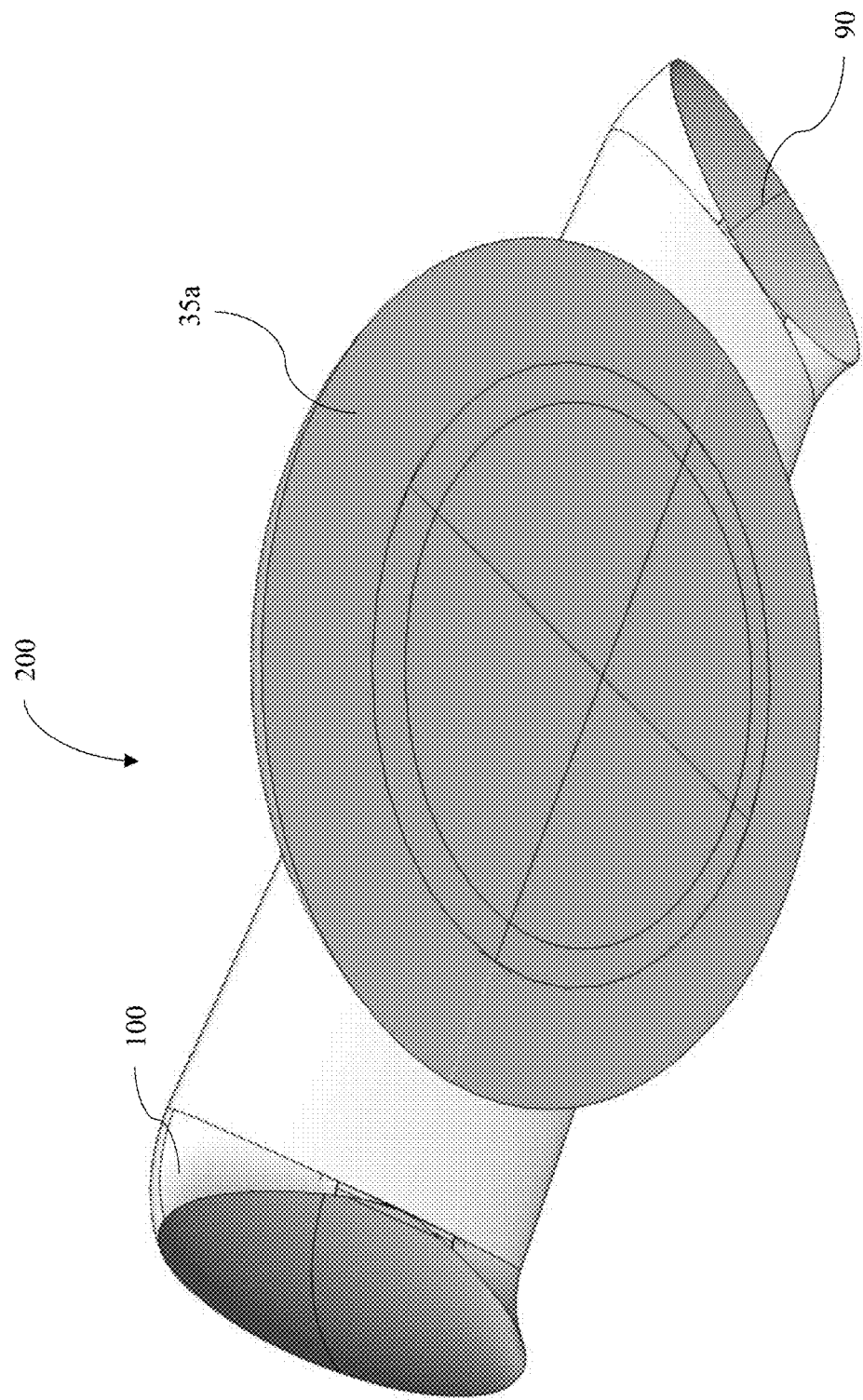
FIG. 8 depicts a perspective bottom view of a two outlet VTOL aircraft.
Figure 9:
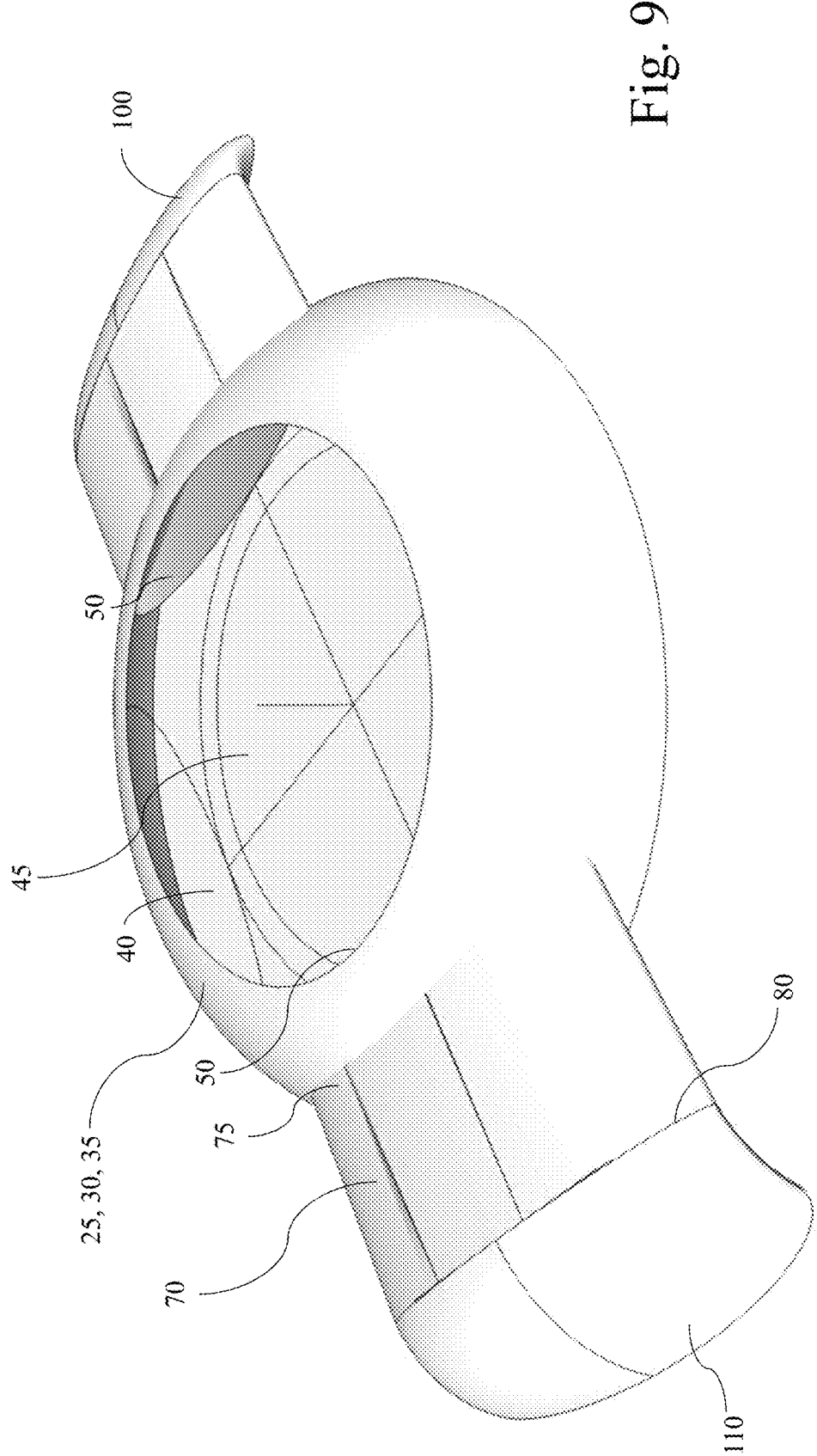
FIG. 9 depicts a perspective top view of a two outlet VTOL aircraft.

In another variant, depicted in FIGS. 8 and 9, a VTOL aircraft 200 comprises exactly two outlets for thrust. The VTOL 200 has a housing 25 and comprises a main body 30. The main body 30 has an upper shell 35 in a shape of a parabola, with the shape of a parabola facing and expanding into a downward-facing end 35a. The upper shell 35 of the main body 30 has a top opening 40 in a shape of a circle. The main body 30 also has a bottom plate 45 in a shape of a flat circle, sealed to the downward-facing end 35a of the upper shell 35 of the main body 30. The top opening 40 of the upper shell 35 of the main body 30 provides an inlet for air to enter into the housing 25. The upper shell 35 of the main body 30 has two openings 50. The set of two openings 50 each has a shape of an oval. Each of the two openings 50 is placed around the upper shell 35 of the main body 30 at 180° to each other, facing each other.

Figure 6:
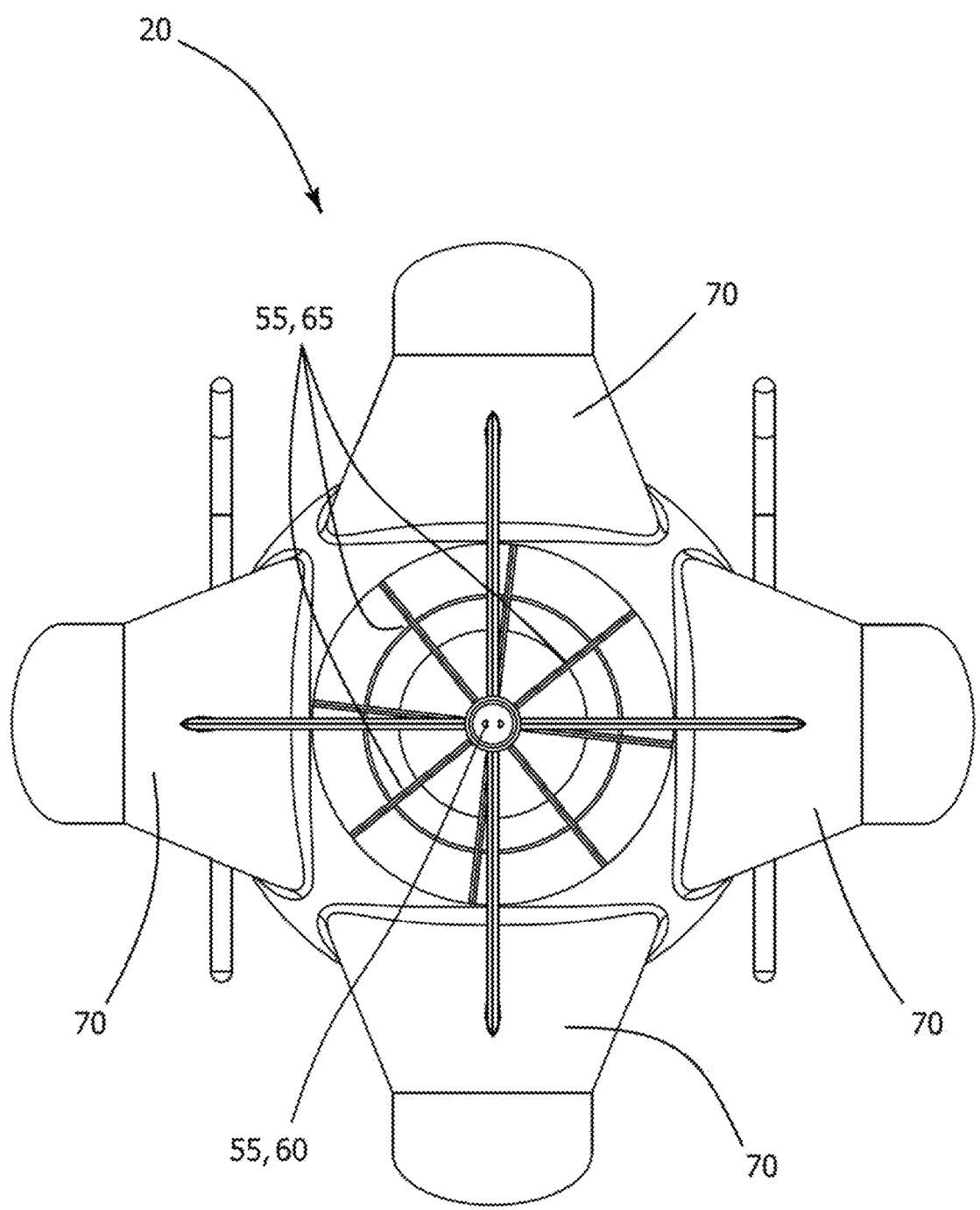
FIG. 6 depicts a top view of the VTOL aircraft of the invention.

As with the previous variant, a fan provides a centrifugal flow of air, similar to FIG. 6. The fan has a central hub, and a plurality of blades extends radially outward from the central hub. The fan is mounted to the top side of the bottom plate 45 of the main body 30.

Two ducts 70 allow and directs air flow. Each of the ducts 70 has a cross-section having a shape of an oval. Each of the ducts 70 has a first end 75 and a second end 80. The first end 75 fits into one of the set of the openings 50, and the second end 80 of each extends horizontally outward therefrom. Each of the ducts 70 has a width and a height 90. The width remains constant from the first end 75 to the second end 80 of each duct 70. The height 90 of each of the ducts 70 remains constant from the first end 75 to the second end 80 of each of the ducts 70. Similar to FIGS. 4 and 7, at least one nozzle 100, allows for exhaust release. Each of the nozzles 100 has a cross-section having a shape of an oval. Each of the nozzles 100 has a first end 105 attached to the second end 80 of one of each of the ducts 70. Each of the nozzles 100 has a turn 115 measuring 90° and facing downward from the second end 80 of each of the ducts 70. Each of the nozzles 100 has a second end 110 at which is a vane 95 for redirecting airflow.

The advantages of the invention are that it provides directed airflow of a VIOL aircraft, thus providing a greater lift and thrust compared to that of current technology. There is less of a need for multiple motors and propellers, thus also reducing fuel consumption and output of carbon emissions. In addition, the nature of the centrifugal fan creates evacuation of the air in the housing by sweeping away the boundary layer of air, thereby greatly reducing the air pressure immediately above the bottom plate. This creates higher pressure of ambient air below the bottom plate to exert force in an upward direction, increasing lift greatly.

What is claimed is:

1. A VTOL aircraft having thrust and directional control, comprising:
   a housing;
   a fan for providing a centrifugal flow of air;
   at least one duct for directing air flow;
   at least one nozzle in fluid communication with and connected to the duct, for expelling air flow;
   wherein the housing comprises a main body;
   the main body has an upper shell in a shape of a parabola, the shape of a parabola faces and expands into a downward-facing end;
   the upper shell of the main body has a top, substantially circular opening;
   the main body also has a bottom plate sealed to the downward-facing end of the upper shell of the main body;
   the bottom plate having a top side and a bottom side; and
   the top opening of the upper shell of the main body provides an inlet for air to enter into the housing.

2. The VTOL aircraft of claim 1, wherein:
   the fan has a central hub; and
   the fan has a plurality of blades extending radially outward from the central hub.

3. The VTOL aircraft of claim 1, wherein each of the at least one duct has a cross-section having a shape of an oval.

4. The VTOL aircraft of claim 1, wherein each of the at least one nozzle has a cross-section having a shape of an oval.

5. The VTOL aircraft of claim 1, wherein:
   each of the at least one duct has a width and a height;
   the width of each of the at least one duct decreases from the first end to the second end of each of the at least one duct; and
   the height of each of the at least one duct remains constant from the first end to the second end of each of the at least one duct.

6. The VTOL aircraft of claim 1, wherein:
   each of the at least one nozzle has a first end attached to the second end of one of each of the at least one duct;
   each of the at least one nozzle has a turn measuring 90° and faces downward from the second end of each of the at least one duct; and
   each of the at least one nozzle has a second end at which is at least one vane for redirecting airflow, with the vane having a curvature.

7. The VTOL aircraft of claim 1, wherein the at least one duct is a group of four ducts.

8. The VTOL aircraft of claim 1, wherein the at least one nozzle is a group of four nozzles.

9. The VTOL aircraft of claim 1, further comprising an attachment to the bottom side of the bottom plate, to allow the VTOL aircraft to land.

10. The VTOL aircraft of claim 1, wherein:
    the upper shell of the main body has at least opening;
    the at least one opening has a shape of an oval; and
    each of the at least one opening is placed around the upper shell of the main body at 90° to each other.

11. The VTOL aircraft of claim 1, wherein:
    each of the at least one duct has a first end and a second end;
    the first end of each of the at least one duct fits into one of the at least one opening; and
    the second end of each of the at least one duct extends horizontally outward therefrom.

12. The VTOL aircraft of claim 2, wherein the fan is mounted to the top side of the bottom plate of the main body.

13. The VTOL aircraft of claim 7, wherein the at least one vane is a group of three vanes.

14. The VTOL aircraft of claim 11, wherein the at least one opening is a set of four openings.

15. The VTOL aircraft of claim 1, wherein the at least one duct is a group of exactly two ducts.

16. The VTOL aircraft of claim 1, wherein the at least one nozzle is a group of exactly two nozzles.

17. The VTOL aircraft of claim 11, wherein the at least one opening is a set of two openings.

* * * * *